(12) United States Patent
Peretti et al.

(10) Patent No.: US 8,240,046 B2
(45) Date of Patent: Aug. 14, 2012

(54) METHODS FOR MAKING NEAR NET SHAPE AIRFOIL LEADING EDGE PROTECTION

(75) Inventors: Michael W. Peretti, Cincinnati, OH (US); Timothy Trapp, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 12/409,927

(22) Filed: Mar. 24, 2009

(65) Prior Publication Data

US 2011/0143042 A1 Jun. 16, 2011

(51) Int. Cl.
*B21D 53/78* (2006.01)
(52) U.S. Cl. .............. 29/889.71; 29/889.7; 29/527.2; 29/402.09
(58) Field of Classification Search .............. 29/889.1, 29/889.2, 889.7, 889.21, 889.71, 527.1, 527.2, 29/402.09; 416/241 A, 96 A, 97 A, 97 R, 416/224, 241 R; 228/1.1, 3.1; 118/723 E
See application file for complete search history.

(56) References Cited

U.S. PATENT DOCUMENTS

| | | | |
|---|---|---|---|
| 3,763,001 A * | 10/1973 | Withers et al. ............ 205/73 |
| 4,006,999 A | 2/1977 | Brantley et al. |
| 4,237,361 A | 12/1980 | Zwintscher et al. |
| 4,782,206 A | 11/1988 | Ayres et al. |
| 5,165,859 A | 11/1992 | Monroe et al. |
| 5,210,946 A | 5/1993 | Monroe et al. |
| 5,449,273 A | 9/1995 | Hertel |
| 5,785,498 A | 7/1998 | Quinn et al. |
| 6,332,272 B1 * | 12/2001 | Sinnott et al. ............ 29/889.1 |
| 7,789,630 B2 * | 9/2010 | Schilling et al. ............ 416/224 |
| 2006/0248718 A1 | 11/2006 | Szela et al. |
| 2007/0243071 A1 | 10/2007 | Mannava et al. |
| 2009/0025365 A1 | 1/2009 | Schilling et al. |
| 2009/0053067 A1 | 2/2009 | Schilling et al. |
| 2010/0242843 A1 * | 9/2010 | Peretti et al. ............ 118/723 E |
| 2011/0097213 A1 * | 4/2011 | Peretti et al. ............ 416/241 A |

FOREIGN PATENT DOCUMENTS

GB 1599392 A 9/1981

OTHER PUBLICATIONS

EP 10157403.6, European Search Report and Written Opinion, Jul. 26, 2010.

* cited by examiner

*Primary Examiner* — David Bryant
*Assistant Examiner* — Ryan J Walters
(74) *Attorney, Agent, or Firm* — William Scott Andes; Gary M. Hartman; Domenica N. S. Hartman

(57) ABSTRACT

Methods for making near net shape airfoil metal leading edge protective strips including providing a high temperature additive manufacturing device; providing a tooling system having a mandrel; a metallic cladding applied to the mandrel; and at least one cooling channel associated with the mandrel applying a metallic deposit to the mandrel having the metallic cladding using the high temperature additive manufacturing device; and concurrently removing heat from the mandrel using the at least one cooling channel to produce the near net shape airfoil metal leading edge protective strip.

20 Claims, 2 Drawing Sheets

METHODS FOR MAKING NEAR NET SHAPE AIRFOIL LEADING EDGE PROTECTION

TECHNICAL FIELD

Embodiments described herein generally relate to methods for making near net shape airfoil leading edge protection. More specifically, embodiments herein generally relate to high temperature additive manufacturing methods for making near net shape airfoil leading edge protection.

BACKGROUND OF THE INVENTION

Many modern turbine engine airfoils, such as blades and vanes, are constructed of a composite laminate or molded fiber. Airfoil metal leading edge (herein "MLE") protective strips can be used to protect composite airfoils from impact and erosion damage that can often occur in the engine environment. In conventional practices, a v-shaped protective metallic strip is often wrapped around the leading edge and sides of the airfoil to provide such protection.

While MLE protective strips can be made from a variety of materials, titanium and titanium alloys are often utilized due to their favorable weight and mechanical properties. However, hot forming methods must be used to fabricate these titanium components. Hot forming typically involves multiple steps with intermediate chemical milling or machining. This can lead to high tooling costs, high yield losses, and environmentally unfriendly processing. These drawbacks are especially true when fabricating thin, complex geometries, such as MLE protective strips.

Additive manufacturing involves the buildup of a metal part or preform to make a net, or near net shape (NNS) component. This approach can make complex components from expensive materials for a reduced cost and with improved manufacturing efficiency. Generally, a freestanding component is built from a computer aided design (CAD) model. However, when the component has a thin and/or complex shape, it can be beneficial to build up the component on a tool for support.

When a high temperature, melt-based process, such as plasma transferred arc or laser cladding, is used as the additive method to make a NNS component, the tool must perform several functions: it must give shape to the part, it must control heat input to provide a uniform microstructure over the entire length of the component with the desired grain size, and it must conduct heat away from the deposit rapidly enough to prevent fusion of the deposited component to the tool. Additionally, the tool must not cause any contamination of the metallic deposit, as contamination can have a disastrous affect on the physical and mechanical properties of the component. This is especially true when working with titanium and titanium alloys.

More specifically, when titanium or titanium alloy is deposited, the risk of contamination of the deposit by the tooling is high due to the high melting point and reactive nature of titanium. Current practice utilizes a monolithic tool made from the same alloy that is being deposited (e.g. titanium or titanium alloy). While this approach helps mitigate the issue of contamination, it results in a very narrow process window for making a sound deposit without fusion of the deposit to the tool. This is because titanium is a relatively poor heat conductor when compared to other heat sink materials (e.g. refractory metals, mild steel, copper).

Accordingly, there remains a need for manufacturing methods that address and overcome the previously discussed issues associated with current MLE protective strip manufacturing.

BRIEF DESCRIPTION OF THE INVENTION

Embodiments herein generally relate to methods for making a near net shape airfoil metal leading edge protective strip comprising: providing a high temperature additive manufacturing device; providing a tooling system comprising: a mandrel; a metallic cladding applied to the mandrel; and at least one cooling channel associated with the mandrel applying a metallic deposit to the mandrel having the metallic cladding using the high temperature additive manufacturing device; and concurrently removing heat from the mandrel using the at least one cooling channel to produce the near net shape airfoil metal leading edge protective strip.

Embodiments herein also generally relate to methods for making a near net shape airfoil metal leading edge protective strip comprising: providing a high temperature additive manufacturing device; providing a tooling system comprising: a mandrel; a metallic cladding applied to the mandrel; and at least one cooling channel associated with the mandrel applying a metallic deposit to the mandrel having the metallic cladding using the high temperature additive manufacturing device; concurrently removing heat from the mandrel using the at least one cooling channel to produce the near net shape airfoil metal leading edge protective strip; and finishing the near net shape airfoil metal leading edge protective strip to a final dimension wherein the airfoil comprises a blade or a vane.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to high temperature additive manufacturing methods for making near net shape airfoil leading edge protective strips.

Figure 1:
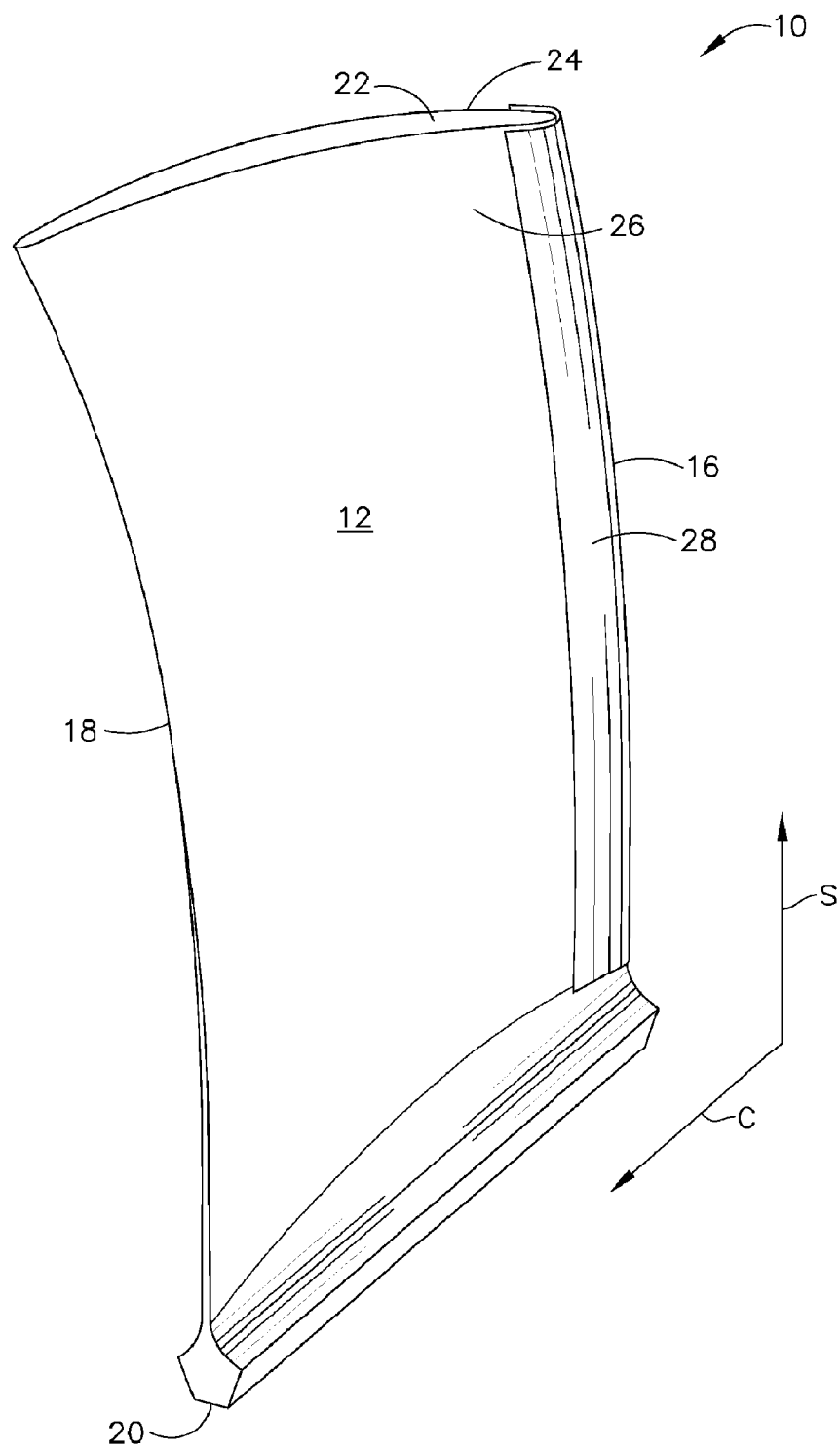
FIG. 1 is a schematic representation of one embodiment of a composite fan blade for a gas turbine engine in accordance with the description herein.

FIG. 1 is a composite fan blade 10 for a gas turbine engine having a composite airfoil 12 generally extending in a chordwise direction C from a leading edge 16 to a trailing edge 18. Airfoil 12 extends radially outward in a spanwise direction S from a root 20 to a tip 22 generally defining its span and having a suction side 24 and a pressure side 26. Airfoil 12 can be constructed from plies of composite material as is known in the art. Embodiments herein describe methods and tooling for making a titanium or titanium alloy metal leading edge (MLE) protective strip 28 for adhesion to airfoil leading edge 16. Though embodiments herein focus on composite fan blades, the methods, tooling and MLE protective strips herein are suitable for use with any composite airfoil, including blades and vanes.

Figure 2:
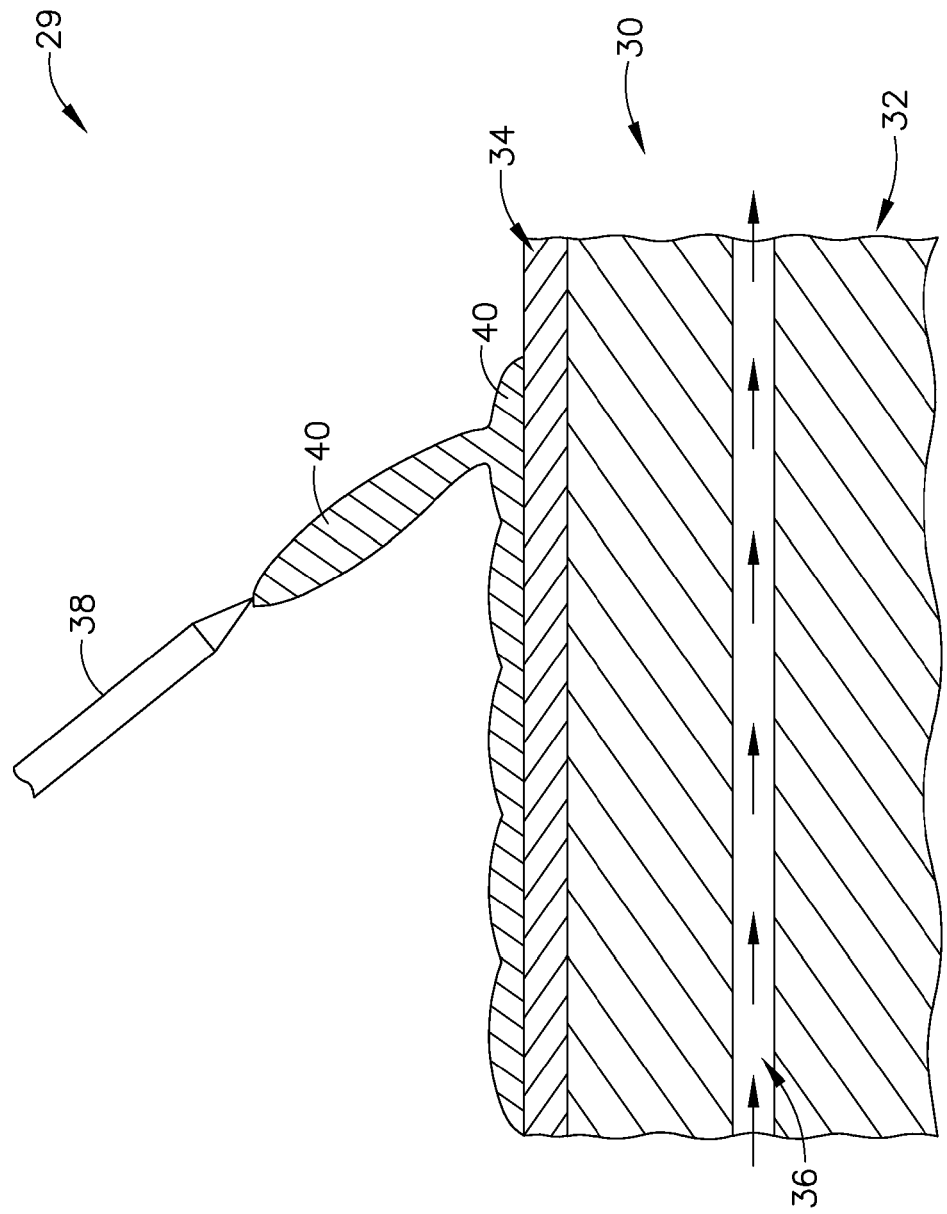
FIG. 2 is a schematic cross-sectional representation of a portion of one embodiment of a high temperature additive manufacturing system in accordance with the description herein.

MLE protective strip 28 can be made using high temperature additive manufacturing processes. As used herein, "high temperature additive manufacturing" refers to processes including plasma transferred arc deposition, laser cladding, gas metal arc welding, ultrasonic welding, electron beam free-form fabrication, shaped metal deposition, and the like. Such processes have operating temperatures in excess of about 3000° C., which in the present case, is well above the melting point of the titanium or titanium alloy metallic deposit. To overcome the previously described issues common to such processes when working with high melting point and/or reactive materials, unique tooling must be employed. FIG. 2 is a schematic representation of a high temperature additive manufacturing system 29 comprising a tooling system 30 suitable for use in conjunction with high temperature additive manufacturing of titanium and titanium alloys.

More particularly, tooling system 30 includes a mandrel 32, a metallic cladding 34, and at least one cooling channel 36 for use with a high temperature additive manufacturing device 38. Mandrel 32 can receive a metallic deposit 40 and can have a shape corresponding to the desired shape of MLE protective strip 28. Mandrel 32 can be single-use or reusable, and can be made from any metallic or nonmetallic material. To help prevent contamination of metallic deposit 40, mandrel 32 should have a thermal conductivity that is at least about two times the thermal conductivity of the metallic deposit. This difference in thermal conductivity can also allow mandrel 32 to serve as a heat sink, thereby providing a larger process window for making a sound deposit without fusion to the mandrel when compared to current practices. Some examples of suitable "metallic materials" for mandrel 32 include, but should not be limited to, titanium, titanium alloy, molybdenum, tungsten, mild steel, and copper, while some examples of suitable nonmetallic materials include, but should not be limited to, graphite, silicon carbide, and carbon-carbon composite.

Metallic cladding (or "cladding") 34 comprises a thin layer of the titanium or titanium alloy in metallic deposit 40 applied to mandrel 32. Cladding 34 serves to further prevent contamination of metallic deposit 40. Cladding 34 can be applied to mandrel 32 by a variety of methods, including plasma spray, roll bonding, plasma transferred arc deposition, arc weld overlay (shielded metal arc welding (SMAW), gas metal arc welding (GMAW), gas tungsten arc welding (GTAW)), flame spray, and physical vapor deposition (PVD). The thickness of cladding 34 can range from about 2 microns to about 2 mm, and in one embodiment, from about 2 microns to about 1 mm. Conventional heat transfer modeling can be used to determine the optimized coating thickness for the particular cladding material being used.

In addition to cladding 34, active cooling of mandrel 32 may be desired to remove heat and further help prevent fusion of MLE protective strip 28 to mandrel 32 and cladding 34. Active cooling can also be used help control grain size of the deposit material and optimize the mechanical and corrosion performance of MLE protection strip 28. Active cooling may be accomplished through the use of at least one cooling channel 36 in association with mandrel 32. Such cooling channels 36 can be attached to mandrel 32, embedded into mandrel 32 (as shown in FIG. 2), machined into mandrel 32, or some combination thereof. An active cooling medium can then be passed through cooling channel 36 (as indicated by arrows) to remove heat from mandrel 32. The active cooling medium can be a liquid, such as water or glycol, or a gas, such as argon, nitrogen, air, or helium.

In use, high temperature additive manufacturing device 38 can be positioned above tooling system 30 for providing metallic deposit 40. The application of metallic (titanium or titanium alloy) deposit 40 to mandrel 32 can be accomplished using conventional techniques as described previously. Once cooled to about ambient temperatures, the resulting near net shape MLE protective strip 28 can be processed further. In one embodiment, MLE protective strip 28 may be finished to final dimensions using conventional methods (e.g. machining) before being removed from mandrel 32 and attached to airfoil leading edge 16. In another embodiment, any required finishing operations can be carried out after protective strip 28 is attached to airfoil leading edge 16. MLE protective strip 28 can then be operably connected to airfoil leading edge 16 using a variety of conventional methods.

The embodiments herein offer benefits over conventional MLE protective strip manufacturing technologies. More particularly, additive manufacturing allows for the leading edge protective strip to be built up to near net shape, thereby reducing material input, material waste, and overall manufacturing time. Applying only the amount of material needed to complete the component conserves expensive raw materials, and material removal and finishing needs (e.g. machining) are drastically reduced. Moreover, additive manufacturing allows for flexibility in changing or updating the design of the MLE protective strip quickly and at a low cost when compared to conventional machining methods. Furthermore, utilizing additive manufacturing processes allows the MLE protective strip to be functionally graded in composition to tailor the properties and structure, thereby allowing advanced design capability.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for making a near net shape airfoil metal leading edge protective strip of an airfoil, the method comprising:
   providing a high temperature additive manufacturing device;
   providing a tooling system comprising:
      a mandrel;
      a metallic cladding applied to the mandrel; and
      at least one cooling channel associated with the mandrel;
   producing the near net shape airfoil metal leading edge protective strip by using the high temperature additive manufacturing device to apply a metallic deposit on the metallic cladding of the mandrel while and concurrently removing heat from the mandrel using the at least one cooling channel to prevent fusion of the metallic deposit to the metallic cladding and the mandrel and to prevent contamination of the metallic deposit; and then
   removing the near net shape airfoil metal leading edge protective strip from the mandrel and from the metallic cladding.

2. The method of claim 1 wherein the metallic deposit comprises titanium or a titanium alloy.

3. The method of claim 1, wherein the high temperature additive manufacturing device is provided to be capable of carrying out a process selected from the group consisting of plasma transferred arc deposition, laser cladding, gas metal arc welding, ultrasonic welding, electron beam free-form fabrication, and shaped metal deposition.

4. The method of claim 1, comprising applying the metallic deposit to the mandrel using a process selected from the group consisting of plasma transferred arc deposition, laser cladding, gas metal arc welding, ultrasonic welding, electron beam free-form fabrication, and shaped metal deposition.

5. The method of claim 1, wherein the step of removing heat from the mandrel comprises passing a cooling medium through the at least one cooling channel.

6. The method of claim 1, wherein the metallic deposit comprises a melting point and wherein the high temperature additive manufacturing device has an operating temperature above about 3000° C.

7. The method of claim 1, wherein the metallic deposit comprises a thermal conductivity and wherein the mandrel comprises a thermal conductivity at least twice the thermal conductivity of the metallic deposit.

8. The method of claim 1, wherein the metallic cladding comprises the same material as the metallic deposit.

9. The method of claim 1, further comprising attaching the near net shape airfoil metal leading edge protective strip to a leading edge of the airfoil.

10. The method of claim 1, further comprising finishing the near net shape airfoil metal leading edge protective strip to a final dimension.

11. The method of claim 1, wherein the metallic cladding comprises a thickness of from about 2 microns to about 2 mm.

12. The method of claim 1, wherein the airfoil is a composite material portion of a blade or a vane.

13. A method for making a near net shape airfoil metal leading edge protective strip, the method comprising:
providing a high temperature additive manufacturing device;
providing a tooling system comprising:
a mandrel;
a metallic cladding applied to the mandrel; and
at least one cooling channel associated with the mandrel;
producing the near net shape airfoil metal leading edge protective strip by using the high temperature additive manufacturing device to apply a metallic deposit on the metallic cladding of the mandrel while and concurrently removing heat from the mandrel using the at least one cooling channel to prevent fusion of the metallic deposit to the metallic cladding and the mandrel and to prevent contamination of the metallic deposit;
removing the near net shape airfoil metal leading edge protective strip from the mandrel and from the metallic cladding;
finishing the near net shape airfoil metal leading edge protective strip to a final dimension; and then
attaching the near net shape airfoil metal leading edge protective strip to a leading edge of an airfoil of a blade or a vane.

14. The method of claim 13 wherein the metallic deposit comprises titanium or a titanium alloy.

15. The method of claim 13, wherein the high temperature additive manufacturing device is provided to be capable of carrying out a process selected from the group consisting of plasma transferred arc deposition, laser cladding, gas metal arc welding, ultrasonic welding, electron beam free-form fabrication, and shaped metal deposition.

16. The method of claim 13, wherein the step of removing heat from the mandrel comprises passing a cooling medium through the at least one cooling channel.

17. The method of claim 13, wherein the metallic deposit comprises a melting point and wherein the high temperature additive manufacturing device has an operating temperature above about 3000° C.

18. The method of claim 13, wherein the metallic deposit comprises a thermal conductivity and wherein the mandrel comprises a thermal conductivity at least twice the thermal conductivity of the metallic deposit.

19. The method of claim 13, wherein the metallic cladding comprises the same material as the metallic deposit.

20. The method of claim 13, wherein the airfoil is formed of a composite material.

* * * * *